US006105598A

United States Patent [19]

Cabrera et al.

[11] Patent Number: 6,105,598

[45] Date of Patent: Aug. 22, 2000

[54] LOW CAPACITY CHLORINE GAS FEED SYSTEM

[75] Inventors: Mario D. Cabrera, Towaco; Gregory Stockinger, Pompton Plains; Albert Van Grouw, North Haledon, all of N.J.

[73] Assignee: United States Filter Corporation, Palm Desert, Calif.

[21] Appl. No.: 08/981,242

[22] PCT Filed: Jun. 14, 1996

[86] PCT No.: PCT/US96/10315

§ 371 Date: Apr. 3, 1998

§ 102(e) Date: Apr. 3, 1998

[87] PCT Pub. No.: WO97/00405

PCT Pub. Date: Jan. 3, 1997

[51] Int. Cl.[7] .......... F16K 11/20

[52] U.S. Cl. .......... 137/113; 137/114; 137/495; 137/630.14; 137/907

[58] Field of Search .......... 137/113, 614.11, 137/630.14, 907, 495, 114

[56] References Cited

U.S. PATENT DOCUMENTS

| | | | |
|---|---|---|---|
| 2,547,823 | 4/1951 | Josephian | 137/78 |
| 2,578,042 | 12/1951 | Chandler | 62/1 |
| 2,630,821 | 3/1953 | Arey et al. | 137/113 |
| 2,641,273 | 6/1953 | Siebens | 137/113 |
| 2,651,491 | 9/1953 | Ashton et al. | 137/113 X |
| 2,775,980 | 1/1957 | Renaudie | 137/113 |
| 3,001,541 | 9/1961 | St. Clair | 137/113 |
| 3,101,734 | 8/1963 | Replogle et al. | 137/114 |
| 3,133,440 | 5/1964 | Conkling | 73/209 |
| 3,141,331 | 7/1964 | Wilson | 73/209 |
| 3,154,945 | 11/1964 | Busillo | 73/209 |
| 3,171,440 | 3/1965 | Napolitano | 137/614.11 X |
| 3,181,358 | 5/1965 | Busillo | 73/209 |
| 3,220,430 | 11/1965 | Haskett | 137/114 |
| 3,342,068 | 9/1967 | Metzger | 73/209 |
| 3,542,067 | 11/1970 | Douglas | 137/614.11 |
| 3,544,212 | 12/1970 | Maroney | 137/93 |
| 3,592,215 | 7/1971 | Davis | 137/113 |
| 3,604,445 | 9/1971 | Jordan et al. | 137/113 |
| 3,646,958 | 3/1972 | Braas | 137/553 |
| 3,691,835 | 9/1972 | Metzger | 73/209 |

(List continued on next page.)

FOREIGN PATENT DOCUMENTS

| | | | |
|---|---|---|---|
| 2206280 | 6/1974 | France | C02B 3/00 |
| 868.515 | 12/1940 | Germany . | |
| 2012702 | 10/1970 | Germany | G05D 11/03 |
| 55-118109 | 9/1980 | Japan . | |
| 44650 | 4/1908 | Switzerland . | |
| WO 87/05133 | 8/1987 | WIPO . | |

*Primary Examiner*—Stephen M. Hepperle
*Attorney, Agent, or Firm*—Wolf, Greenfield & Sacks, P.C.

[57] ABSTRACT

A gas feed system is disclosed for supplying a gas such as chlorine to a water system for chlorinating the water. The gas feed system includes multiple containers and provides for automatic switching over from one container to a second container once the first container is empty and such that the first container can be completely emptied. The invention also includes a gas feed regulator for controlling the supply of gas from a container such as a chlorine cylinder, the regulator having a simplified construction.

20 Claims, 8 Drawing Sheets

U.S. PATENT DOCUMENTS

| | | | |
|---|---|---|---|
| 3,779,268 | 12/1973 | Conkling | 137/113 |
| 4,050,305 | 9/1977 | Evans et al. | 73/209 |
| 4,099,412 | 7/1978 | Nehrbass | 73/209 |
| 4,197,809 | 4/1980 | Johnson | 116/275 |
| 4,202,180 | 5/1980 | Cox | 62/50 |
| 4,223,557 | 9/1980 | Brinkman | 73/861.55 |
| 4,241,749 | 12/1980 | Petursson | 137/100 |
| 4,245,513 | 1/1981 | Clements et al. | 73/861.55 |
| 4,250,144 | 2/1981 | Ratigan | 422/112 |
| 4,254,789 | 3/1981 | Westberg | 137/88 |
| 4,254,790 | 3/1981 | Eriksson et al. | 137/100 |
| 4,257,279 | 3/1981 | Marx | 73/861.57 |
| 4,324,267 | 4/1982 | Bach | 137/100 |
| 4,333,833 | 6/1982 | Longley et al. | 210/198.1 |
| 4,341,234 | 7/1982 | Meinass et al. | 137/110 |
| 4,380,242 | 4/1983 | Bresie et al. | 137/113 |
| 4,489,016 | 12/1984 | Kriebel | 261/122 |
| 4,655,246 | 4/1987 | Phlipot et al. | 137/505.11 |
| 4,674,526 | 6/1987 | Athanassiu | 137/113 |
| 4,752,211 | 6/1988 | Sabin | 431/90 |
| 4,830,743 | 5/1989 | Koster et al. | 230/96.1 |
| 4,867,413 | 9/1989 | Tessler | 251/304 |
| 4,923,092 | 5/1990 | Kirschner et al. | 222/129.4 |
| 4,986,122 | 1/1991 | Gust | 73/204.15 |
| 4,993,684 | 2/1991 | Prina | 251/367 |
| 5,046,701 | 9/1991 | Barber | 251/129.02 |
| 5,083,546 | 1/1992 | Detweiler et al. | 123/520 |
| 5,095,950 | 3/1992 | Hallberg | 137/88 |
| 5,151,250 | 9/1992 | Conrad | 422/2 |
| 5,158,748 | 10/1992 | Obi et al. | 422/100 |
| 5,189,991 | 3/1993 | Humburg | 123/41.1 |
| 5,193,400 | 3/1993 | Lew | 73/861.56 |
| 5,320,128 | 6/1994 | Tablert | 137/116.5 |

LOW CAPACITY CHLORINE GAS FEED SYSTEM

FIELD OF THE INVENTION

The invention relates to low capacity gas feed systems of the type for use in feeding chlorine gas to a water supply to chlorinate the water. More specifically the invention relates to gas flow regulators for controlling the flow of gas from gas cylinders and valves for controlling gas flow from one gas supply to another gas supply.

BACKGROUND PRIOR ART

Low capacity chlorine gas feed systems provide for the supply of gas from chlorine gas containers through a gas pressure regulator device to an injector wherein the chlorine gas is delivered to a water supply conduit. One prior art chlorine feed system is illustrated in the assignee's Technical Data Sheet 910.250 titled "SONIX 100™ Chlorinator." Attention is also directed to the Konkling U.S. Pat. No. 3,779,268 illustrating a prior art regulator valve for a chlorine gas system.

One limitation of prior art chlorine gas supply systems is the amount of chlorine which can be delivered to the water supply. Use of a single gas cylinder permits the discharge of chlorine gas only at a limited flow rate before frosting of the valve makes the gas regulator valve inoperative.

In many areas, chlorine gas suppliers require that chlorine tanks be emptied completely before they can be returned to the supplier for refilling. Prior art gas regulation systems have not provided an effective mechanism for insuring efficient use of all of the chlorine in the tanks. In other areas, chlorine gas suppliers require that chlorine tanks returned for refilling contain a predetermined quantity of chlorine in the tanks. Prior art gas regulation systems do not provide an effective mechanism for controlling the amount of gas left in the gas supply cylinders.

Another limitation of prior art chlorine gas systems is that they have not provided an effective and efficient system for switching over from one chlorine supply container to another chlorine supply container once the supply in the first container is exhausted.

Another limitation of prior art gas feed systems including an arrangement for switching from one gas supply cylinder to another cylinder is that they do not insure complete use or controlled use of the gas in the first container.

Another disadvantage of prior art gas supply systems is that they require mechanically complex regulator valve assemblies and are expensive to manufacture and can be unreliable.

SUMMARY OF THE INVENTION

The present invention provides a gas feed system for supplying a gas, and can be used to supply gas such as chlorine to a water system for chlorinating the water. The gas feed system includes a pair of gas containers or multiple banks of containers and provides for automatic switch over from one container or a bank of containers to a second container or bank of containers once the first container or bank of containers is empty and such that the first containers can be completely emptied. The gas feed system of the invention also provides for automatic switch over from one bank of containers to a second bank of containers while providing for complete emptying of the first bank of containers.

The gas feed system of the invention facilitates the use of two sets or banks of multiple tanks of gas. When used to supply chlorine to a water system, the gas supply system can have one bank of tanks supplying chlorine to an injector while the other bank of tanks can remain in a standby condition and such that the second bank of tanks will automatically supply chlorine to the water supply when the amount of gas in the first bank of tanks falls below a predetermined level. Additionally, the tanks in each bank of tanks will discharge even quantities of gas. Gas discharged from a single tank can be limited by frosting that occurs in the control valves. The provision of multiple tanks in parallel permits the discharge of sufficient amounts of gas, and the provision of an even draw-down device embodied in the invention provides for uniform simultaneous discharge from a pair of gas tanks or cylinders.

Another principle feature of the invention is the provision of a gas feed regulator for controlling the supply of gas from a container such as a chlorine cylinder, the regulator having a simplified construction. In one preferred embodiment of the invention, the gas feed regulator includes a retractable center pin extending through the center of a pressure responsive diaphragm, the center pin being movable to provide for manual shutoff of the regulator to interrupt gas flow from the gas supply. The regulator includes a manual control lever connected to the center pin, the lever being rotatable 180° to manually shut off the valve.

The gas feed regulator embodying the invention further includes the provision of a manual control/operation indicator switch mounted on the regulator housing and engaging the operating lever, the switch being rotatable to rotate the operating lever and the center pin between a manual "off" and a "stand-by" operating position. The indicator switch further cooperates with the operating lever to form a detent assembly. The detent assembly holds the center pin in a stand-by position until a differential pressure caused by vacuum on the diaphragm causes the center pin to move to an "on" or operating position wherein gas can flow through the regulator from the gas container. When the container is exhausted of gas, the vacuum on the regulator diaphragm will move the center pin to a position where the detent assembly and indicator switch move to an "empty" position. The indicator switch can be rotated manually to a "off" position where the gas flow through the regulator is manually interrupted. The vacuum regulator of the invention further includes a primary check valve operated by the central pin and the vacuum operated diaphragm and further includes a secondary pressure check valve also operated by the center pin and diaphragm.

One of the advantages of the vacuum regulator included in the gas supply system embodying the invention is that the vacuum regulator has an efficient construction, has a minimum number of components and can be economically assembled and manufactured.

The gas feed system embodying the invention further includes a remote automatic switchover device connected to two gas containers or two banks of gas containers and providing for switch over from one container or bank of containers to the other container or bank of containers when the first empties. The remote automatic switchover device includes a valve housing and a chamber, two inlets communicating with respective ones of the banks of gas cylinders and an outlet communicating with a gas injector supplying gas to a water source. A double acting spool is housed in the chamber and selectively closes one or the other inlet. A manually operable arm connected to the double acting spool is movable between a position opening one outlet and a detent is provided for maintaining the spool in that position until gas pressure supplied through the one inlet decreases to a pressure wherein pressure supplied from the other inlet on the spool member overcomes the detent and opens the other inlet leaving the spool member in a position where both inlets are open.

The gas feed system further includes at least one even drawdown device operably connected to two gas cylinders and connecting the regulators of those two cylinders to the remote switchover device. The even drawdown device provides for even flow of gas from the two gas cylinders connected to the even drawdown device.

One of the principal features of the invention is the provision in the vacuum regulator of a diaphragm assembly including a diaphragm made of Teflon sheet, the Teflon sheet being heat formed to include concentric grooves. A concentric groove at the periphery of the diaphragm is housed in a groove provided in the opposed two halves in the regulator body and secured in place by an O-ring seal. A concentric groove in the central portion of the diaphragm is similarly clamped using an O-ring between a central diaphragm backing plate and an opposed backing plate nut. The construction of the heat formed diaphragm and O-ring seals permits the use of fewer mechanical components to secure the diaphragm and the use of lower clamping pressures on the diaphragm while also providing a reliable long lasting diaphragm configuration. The diaphragm arrangement is an improvement over prior art constructions where heat can cause variations in the thickness of the diaphragm membrane and loosening of clamping screws. This permits the membrane to pull away from the supporting structure causing wrinkling of the membrane and permitting air leakage into the vacuum regulator.

DESCRIPTION OF THE PREFERRED EMBODIMENT

Gas Feed System

Figure 1:
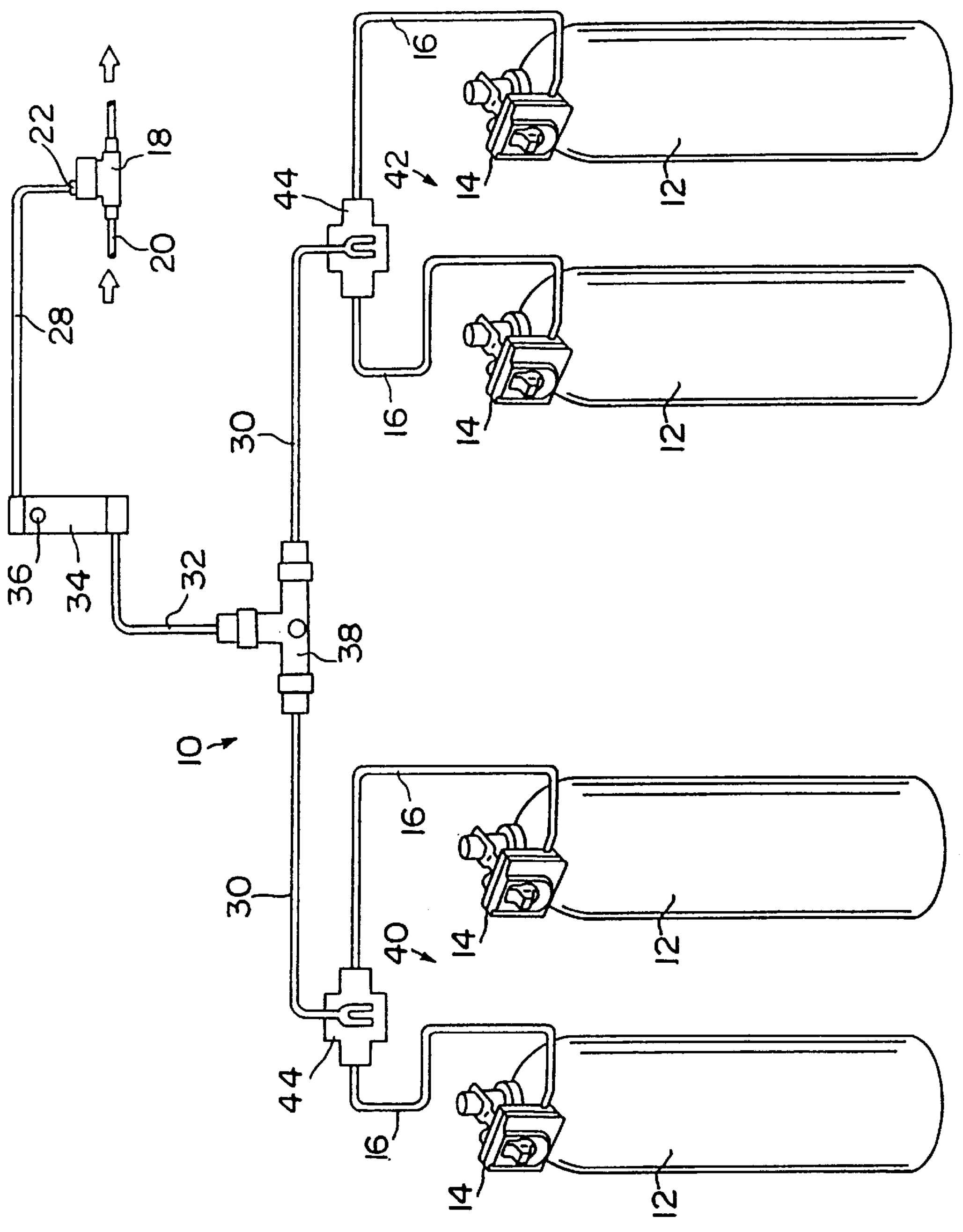
FIG. 1 is a schematic illustration of a gas supply system embodying the invention.
Figure 16:
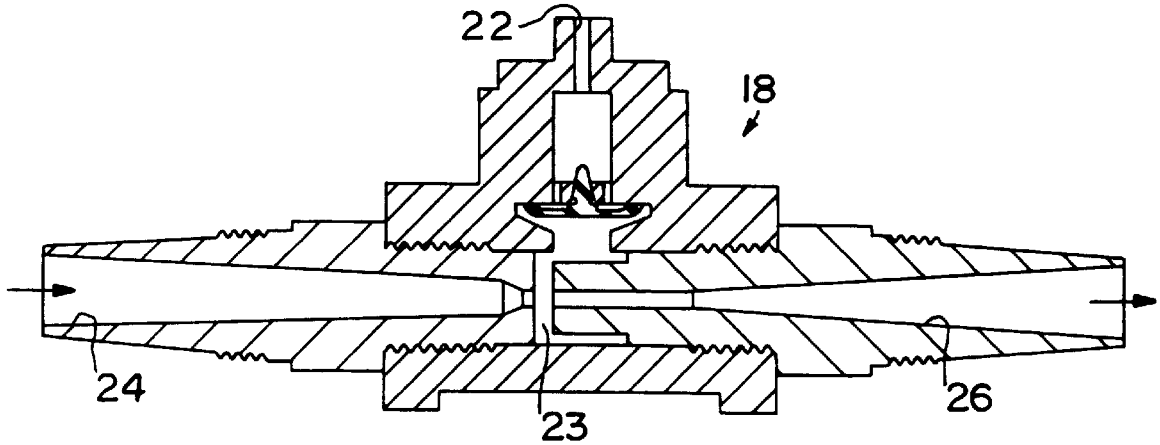
FIG. 16 is an enlarged cross section view of a gas injector included in the gas supply system shown in FIG. 1.

FIG. 1 illustrates a gas feed system embodying the invention and including a plurality of gas cylinders 12. In the illustrated arrangement the gas cylinders 12 are conventional chlorine gas containers. The gas feed system 10 further includes a vacuum regulator 14 mounted on each cylinder 12, each of the vacuum regulators 14 comprising a vacuum operated valve intended to control the supply of chlorine gas from the gas cylinders 12. The vacuum regulators 14 are connected through plastic tubing or conduits 16 to supply chlorine gas to a chlorine gas injector 18. The chlorine gas injector 18 is best shown in FIG. 16 and has a conventional construction. The gas injector 18 provides for mixing of gas into water flowing through a water supply conduit 20 and facilitates the injection of chlorine gas into the water supply. At the injector 18, metered gas entering port 22 is dissolved at chamber 23 in the water stream flowing through passage 24 from the water supply conduit 20. The resultant solution is discharged through passage 26 to the point of application and the flow of water through the injector 18 generates a vacuum at port 22 and in the tubing or conduit 28. It is this vacuum in the tubing 28 which draws gas through the conduits 16, 30 and 32 into the injector 18 and which operates the vacuum regulators 14 connected to the cylinders 12.

In the illustrated arrangement of the gas feed system, a rotameter 34 is provided between the gas feed cylinders 12 and the injector 18. The rotameter 34 indicates the volume or rate of the flow of gas through the tubing 32 and 28 to the injector 18. The rotameter 34 can also include a control valve 36 for controlling the rate of flow through the tubing 32 and 28 to the injector 18. The construction of the rotameter 34 and the control valve 36 is conventional and will not be described in detail. While in the illustrated arrangement the rotameter 34 is mounted remote from the vacuum regulators 14, in other arrangements a rotameter 34 could be mounted directly on each vacuum regulator to indicate the flow of gas from the individual gas cylinders 12 to the tubing 16.

The gas supply system 10 shown in FIG. 1 further includes a remote switchover device 38 for providing for supply of chlorine gas from a first bank 40 of cylinders during initial operation of the chlorine gas system while maintaining a second bank 42 of cylinders in a standby condition. The remote switchover device 38 includes a valve which isolates the second bank 42 of cylinders during initial operation of the cylinders and then, when the gas in the first bank 40 of cylinders nears an empty condition, the remote switchover device 38 opens to provide for supply of gas from the second bank 42 of cylinders to the injector 18 while also maintaining the first bank 40 of cylinders in communication with the injector 18 so that all of the gas in the first bank 40 of cylinders can be used.

The remote switchover device 38 can then be manually switched over to connect only the second bank 42 of cylinders to the injector 18 and to isolate the first bank 40 of cylinders. The cylinders 12 in the first bank 40 can then be removed from the system for refilling and be replaced with full gas containers. The remote switchover device 38 can then maintain those containers 12 in the standby condition until the second bank 42 of cylinders nears an empty condition.

In the gas supply system 10 illustrated in FIG. 1, each bank of cylinders 40 and 42 further includes an even drawdown device 44 connecting the two vacuum regulators 14 in that bank of cylinders to the tubing 30 communicating with the remote switchover device 38 and the injector 18. The even drawdown device 44 provides for simultaneously even or equal flow of gas from the two cylinders 12 in the bank of cylinders 40 to the remote switchover device 38.

Vacuum Regulator

Figure 2:
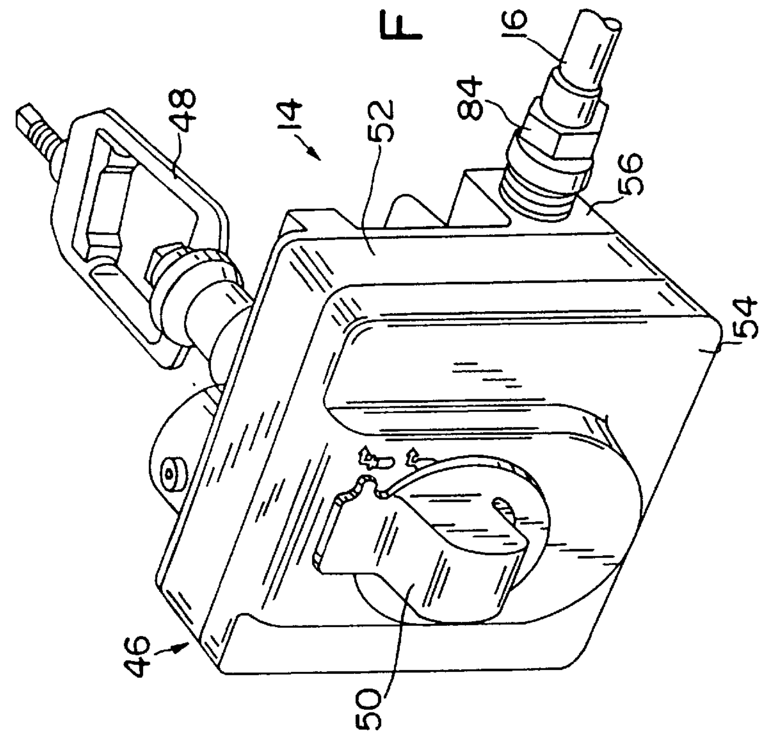
FIG. 2 is a perspective view of a vacuum regulator and cylinder mounting bracket included in the gas feed system shown in FIG. 1.
Figure 3:
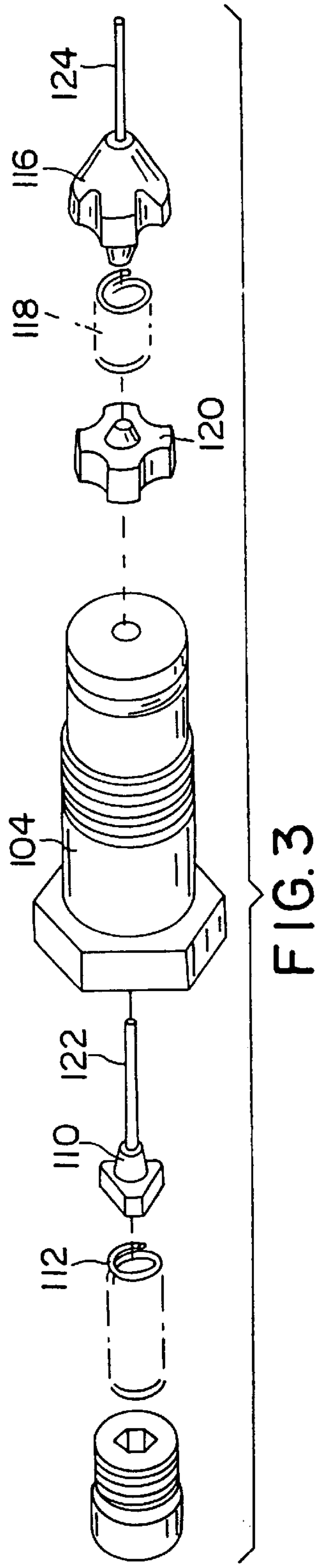
FIG. 3 is an exploded perspective view of a gas flow control valve assembly included in the vacuum regulator shown in FIG. 2.
Figure 11:
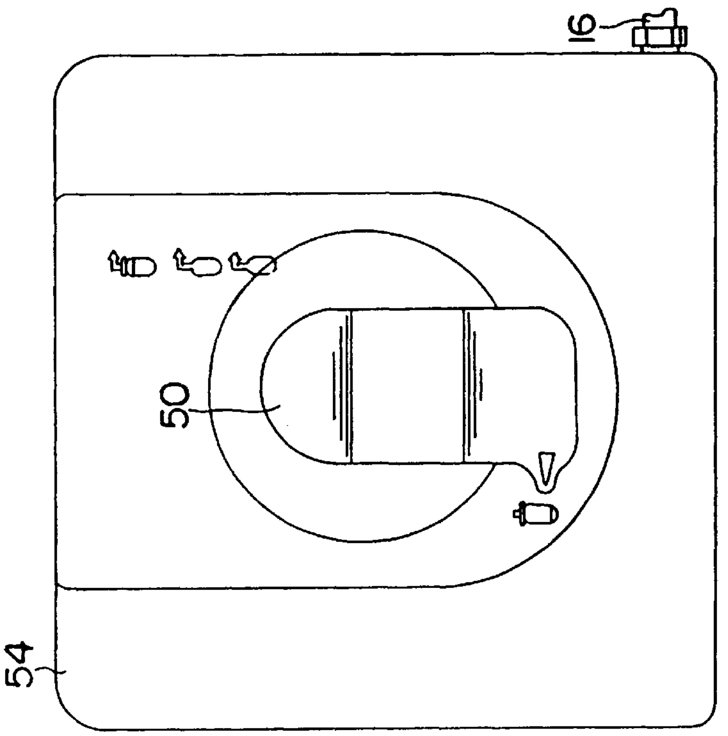
FIG. 11 is a view similar to FIG. 5 and showing the vacuum regulator in the "off" position.

Referring more particularly to the vacuum regulators, they each include a housing 46 clampingly mounted to respective ones of the gas cylinders by a yoke clamp or bracket assembly 48. The bracket assembly 48 for mounting the regulators 14 to the gas cylinders is conventional and will not be described in detail. Each vacuum regulator 14 also includes a control knob/indicator 50 which is positionable as shown in FIG. 11 in an "off" position preventing flow of gas through the regulator 14. The control knob 50 can be manually rotated counterclockwise 180° from the "off" position shown in FIG. 11 to a "standby" position shown in FIG. 2 and FIG. 5. As will be explained below, when the control knob 50 of the vacuum regulator 14 is in the "standby" position, the regulator valve is closed until vacuum in the tubing 16 actuates the regulator valve to cause the control knob 50 to move downwardly to the "on" position shown in FIG. 7 and wherein the regulator valve will then permit discharge of chlorine gas in response to vacuum in the tubing 16. When the cylinder 12 connected to that regulator 14 is empty of gas, vacuum in the tubing 16 will then actuate the regulator to cause the control knob to move to the "empty" position shown in FIG. 9 to thereby indicate depletion of the gas in the chlorine cylinder 12. The operator can then manually rotate the control knob to the "off" position of FIG. 11, and the cylinder 12 can then be disconnected from the regulator 14 and then replaced with a full cylinder.

Figure 4:
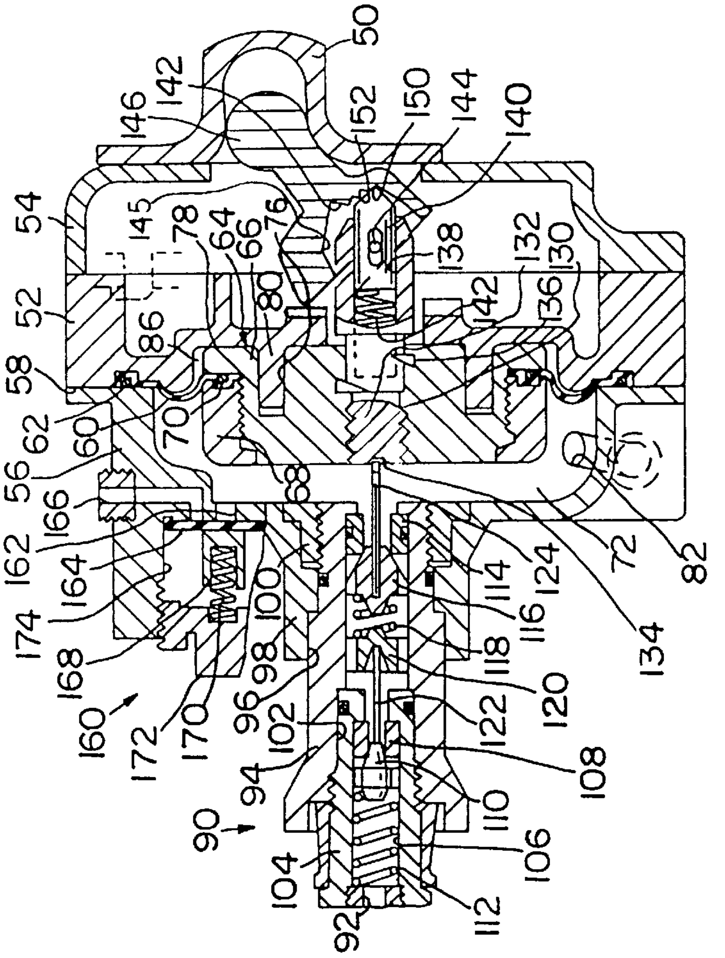
FIG. 4 is an enlarged cross section view of a vacuum regulator included in the gas feed system shown in FIG. 1 and showing the vacuum regulator in a "standby" position.

Referring now more specifically to the construction of the vacuum regulator 14, as seen in FIG. 4, the vacuum regulator includes a front housing 52 supporting a front cover 54. The cover 54 in turn supports the control knob 50 for vertical slidable movement between the "standby", "on" and "empty" positions and also for rotation of the control knob 50 to the "off" position.

The vacuum regulator 14 also includes a rear housing 56 fixed to the rear face 58 of the front housing 52. A flexible diaphragm 60 has a periphery 62 clamped between the front 52 and rear 56 housing. The diaphragm includes a central opening housing a diaphragm backing plate assembly 64 comprised of a diaphragm backing plate 66 and a diaphragm backing plate nut 68 which clampingly engages the inner portion 70 of the diaphragm 60 therebetween. The diaphragm backing plate assembly 64 is housed in the chamber 72 defined by the rear housing 56, and the diaphragm backing plate assembly 64 is movable with the diaphragm in the chamber 72 between the positions shown in FIGS. 4, 6, 8 and 10. The backing plate nut 68 is threaded onto a projecting threaded extension 74 of the backing plate 66 such that the backing plate nut 68 clampingly engages the diaphragm 60 and clamps it against the backing plate 66 in fluid tight relation.

The diaphragm backing plate 66 includes a circular groove 76 in its front face 78, the groove 76 housing a projecting circular flange 80 of the front housing 52 such that the diaphragm backing plate assembly 64 is supported for movement in the chamber 72 of the rear housing 56 toward and away from the front housing 52.

The vacuum tubing 16 communicates with the chamber 72 through a port 82, and a coupling 84 (FIG. 2) connects the tubing to the rear housing 56. The vacuum in the tubing 16 thus draws a vacuum in the chamber 72 defined by the rear housing 56. The front face of the diaphragm 60 is subjected to atmospheric pressure in the space 86 between the front housing 52 and the diaphragm 60 and diaphragm backing plate 66. When vacuum is applied in the chamber 72 defined by the rear housing 56, atmospheric pressure on the diaphragm 60 and diaphragm backing plate 66 will tend to force the diaphragm backing plate assembly 64 rearwardly into the rear housing 56.

The vacuum regulator 14 also includes a valve assembly 90 fixed to the rear housing 56 and controlling flow of chlorine gas from the gas cylinder through the inlet port 92 and into the vacuum chamber 72 where it can then be drawn through the port 82 to the vacuum line or tubing 16.

The valve assembly 90 includes a secondary valve housing 94 having one end housed in a bore 96 in a sleeve 98 projecting rearwardly from the rear housing 56. A valve housing retainer nut 100 is provided to secure the secondary valve housing 94 to the sleeve 98 and rear housing 56. The secondary valve housing 94 includes a central bore 102 housing a regulator nipple 104 which is threaded into the secondary valve housing 94. The regulator nipple 104 includes a central bore 106 housing a valve seat 108 and a valve body 110 biased against the valve seat 108 by a first compression spring 112. The secondary valve housing 94 also houses a secondary valve seat 114 and a secondary valve body 116 biased against that valve seat by a second compression spring 118. The second compression spring 118 is supported by a stop member 120 slidably housed in the bore 102 in the secondary valve housing 94. A rod 122 connected to the first valve body engages the stop 120 to provide a connection between the stop 120 and the first valve body 110. A second rod 124 extends from the secondary valve body 116 and projects forwardly into the vacuum chamber 72 provided by the rear housing. The regulator nipple 104 also includes the inlet port 92 which communicates through the clamping bracket to the gas cylinder 12.

Figure 10:
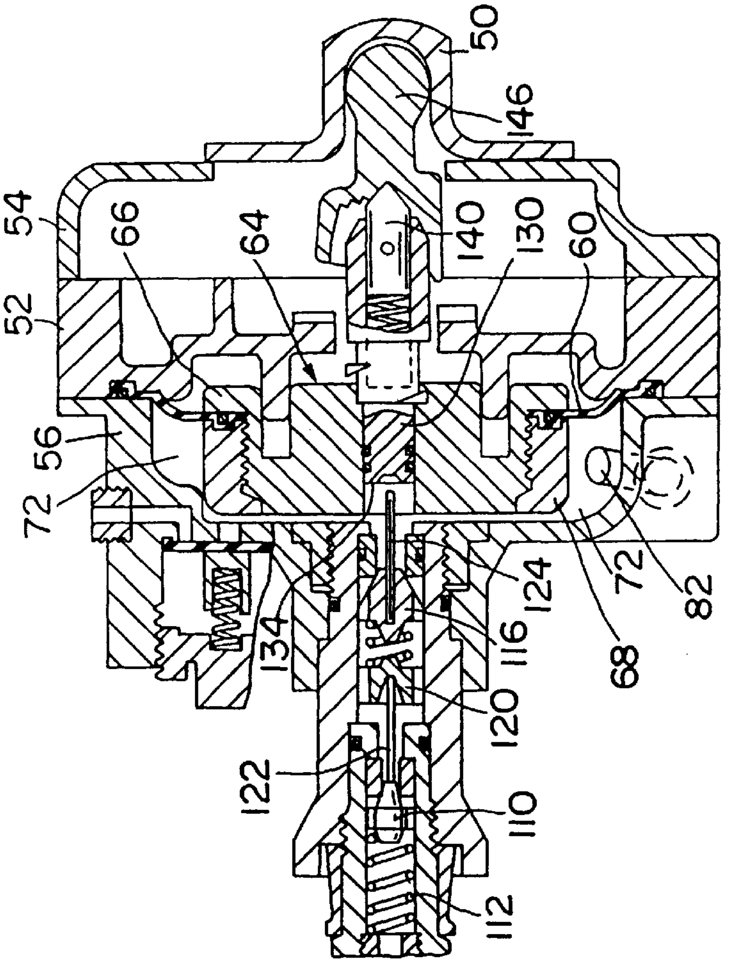
FIG. 10 is a view similar to FIG. 4 and showing the vacuum regulator in an "off" position.

The regulator also includes an operating pin or shaft 130 threaded into a central bore 132 of the diaphragm backing plate 66 and located centrally with respect to the diaphragm 60. The operating pin 130 has an end 134 adapted to move with the diaphragm backing plate assembly 64 and to selectively engage the end of the rod 124 extending from the secondary valve body 116 and to provide for movement of the secondary valve body 116 away from the secondary valve seat 114. The operating pin 130 is threaded into the diaphragm backing plate 66 such that it moves with the diaphragm backing plate 66 in the direction of its longitudinal axis. The threads 136 connecting between the operating pin 130 and the diaphragm backing plate assembly 64 permits the operating pin 130 to be rotated 180° to an "off" position as shown in FIG. 10 where it is backed out of the diaphragm backing plate 66 such that it cannot engage the rod 124 extending from the secondary valve body 116.

The opposite end of the operating pin 130 includes a cavity or bore 138 housing an operating lever pawl 140 and a compression spring 142. The operating lever pawl 140 is connected to the operating pin 130 by a cross pin 144 and is supported by the operating pin 130 such that the pawl 140 is resiliently biased by the compression spring 142 into engagement with cam surfaces 142 provided in a recess 145 in the end of a lever 146. The cross pin 144 connecting the operating lever pawl 140 to the end of the operating pin 130 also pivotally connects the lever 146 to the operating pin 130.

Figure 5:
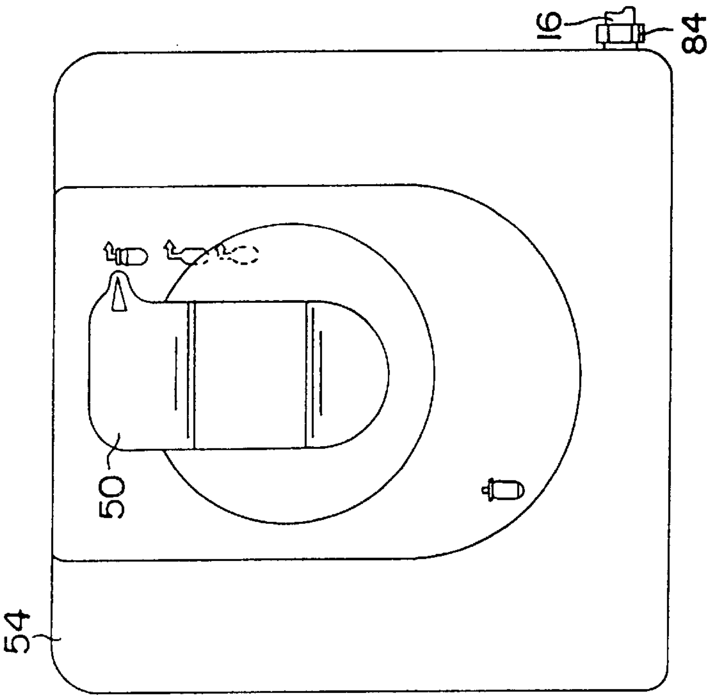
FIG. 5 is a side view of the vacuum regulator shown in FIG. 4.

In operation of the vacuum regulator 14, when the operating lever 50 is in the "standby" position shown in FIGS. 4 and 5, and when there is no vacuum applied through the port to the vacuum chamber 72, the components of the vacuum regulator 14 will assume the position illustrated in FIG. 4, with both the first valve body 110 and second valve body 116 in engagement with the respective valve seats 108 and 114 thereby precluding flow of gas from the inlet port 92 into the vacuum chamber 72.

Figure 6:
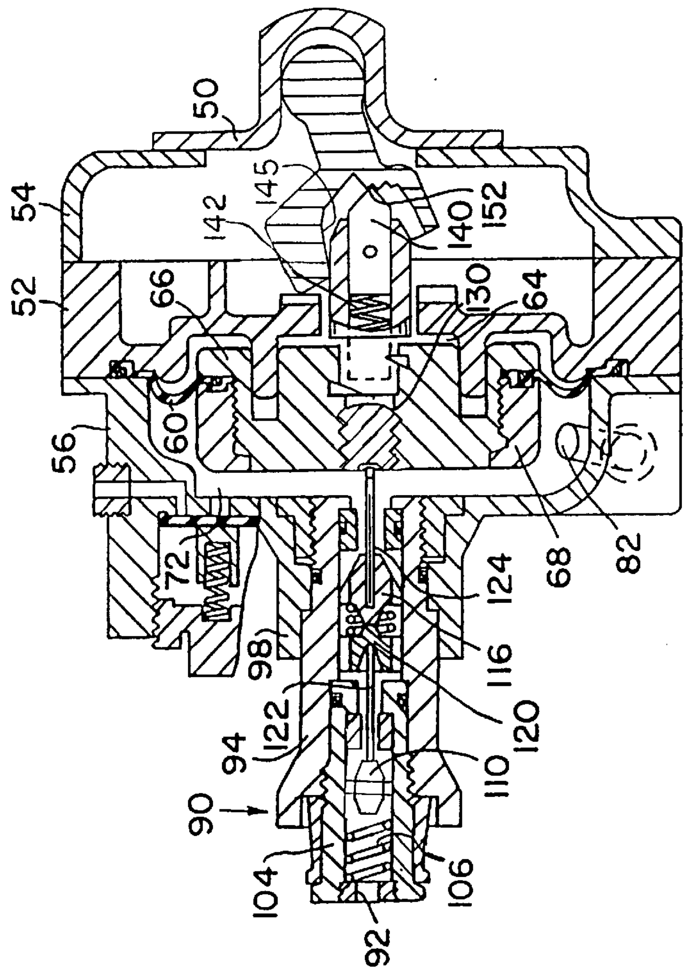
FIG. 6 is a view similar to FIG. 4 and illustrating the vacuum regulator in an "on" position.

When the remote switchover valve 38 actuates to cause vacuum to be drawn in the vacuum tubing 16 and the vacuum chamber 72, vacuum in the vacuum chamber 72 will cause the diaphragm 60 and the diaphragm backing plate assembly 64 to move to the position shown in FIG. 6. The operating pin 130 is carried by the diaphragm backing plate assembly 64 and such that the end 134 of the operating pin 130 will engage the rod 124 projecting from the secondary valve body 116. This movement of the operating pin 130 opens both the secondary valve 116 and the first valve body 110 to provide for flow of gas through the inlet port 92 into the vacuum chamber 72 where it will be drawn by vacuum in the tubing 16 through the port 82.

Figure 7:
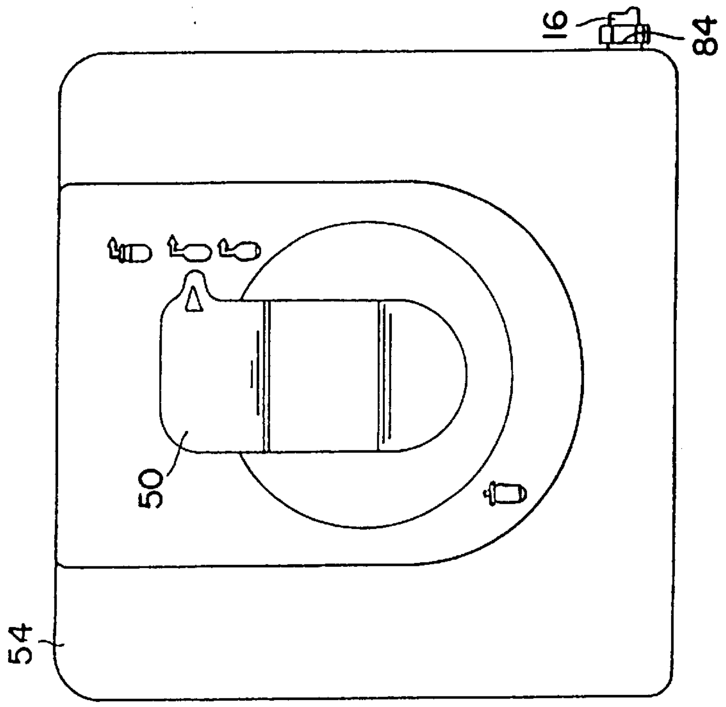
FIG. 7 is a view similar to FIG. 7 and showing the vacuum regulator in the "on" position.

As the opposite end of the operating pin 130 moves to the left as seen in FIGS. 4 and 6, the end of the operating lever pawl 140 will move with respect to the lever 146 from engagement with the cam surface 150 shown in FIG. 4 to engagement with the cam surface 152 shown in FIG. 6 thereby causing the operating lever 50 to be moved from the "standby" position shown in FIG. 5 to the "on" position shown in FIG. 7. The chlorine gas cylinder 12 will then continue to supply gas to the injector 18 until the cylinder 12 is completely empty. When the cylinder 12 is empty, the vacuum in the vacuum chamber 72 will increase causing the diaphragm 60 and the diaphragm backing plate assembly 64 to move from the position shown in FIG. 6 to the position shown in FIG. 8. When the diaphragm backing plate assembly 64 moves to this position, the operating pin 130 and operating lever pawl are moved to the cam position shown FIG. 8 and the operating lever 50 will be caused to move by the operating lever pawl 140 and the cam surface 154 of the operating lever to the "empty" position shown in FIGS. 8 and 9.

Figure 9:
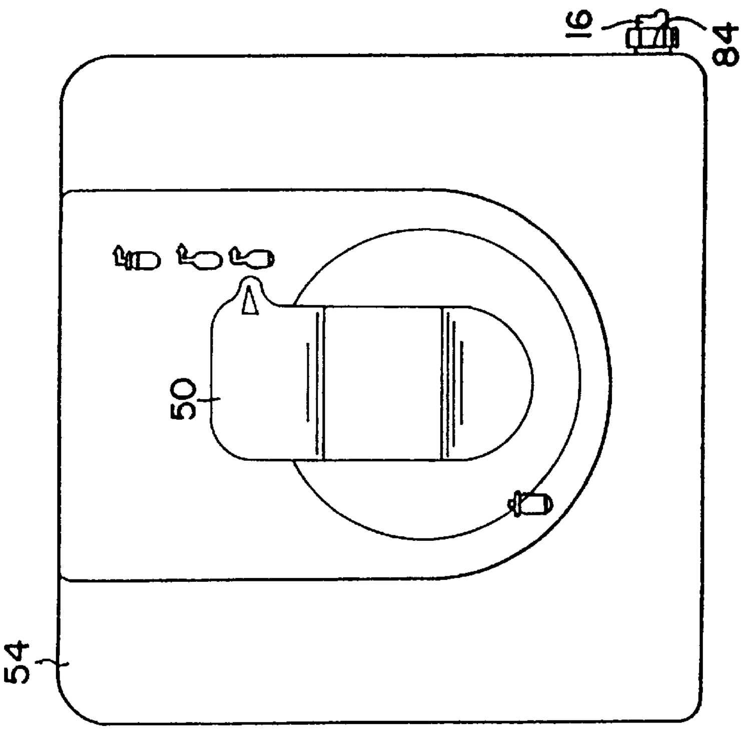
FIG. 9 is a view similar to FIGS. 5 and 7 and showing the vacuum regulator in an "empty" position.
Figure 8:
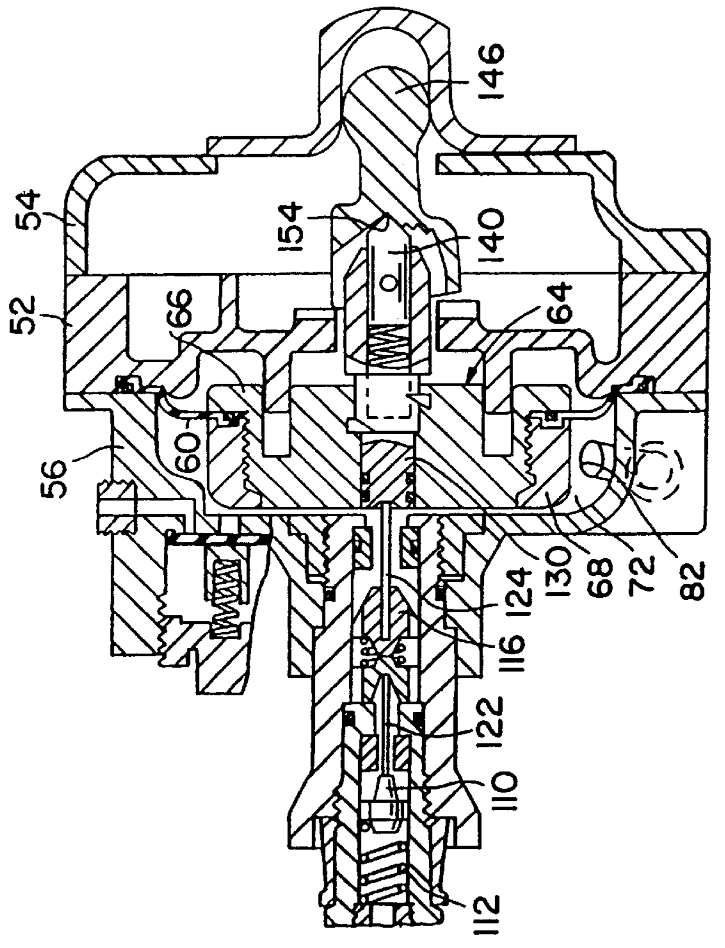
FIG. 8 is a view similar to FIGS. 4 and 6 and showing the vacuum regulator in an "empty" position.

The operator can then rotate the operating lever 180° from the "empty" position shown in FIG. 9 to the "off" position shown in FIG. 11. Rotation of the operating lever 50 to the "off" position causes rotation of the operating pin 130 with respect to the diaphragm backing plate 66 and threadably backs the operating pin 130 out of the diaphragm backing plate 66 thereby pulling the end 134 of the operating pin 130 away from the rod 124 connected to the secondary valve body 116. As shown in FIG. 10, the check valves 110 and 116 can then move to a closed position.

One of the principle features of the invention is the construction of the vacuum regulator to provide both a primary and a secondary backup check valve 110 and 116 operated by a single diaphragm 60. In the event one of the check valves fails to close fully, the other check valve will insure complete sealing of the valve assembly. But, while a second check valve 116 can be provided, the construction of the regulator of the invention facilitates the use of only a single diaphragm 60 to provide for movement of both valve assemblies.

The vacuum regulator also includes a pressure relief valve 160 for discharging gas from the regulator in the event that a gas pressure develops in the vacuum chamber 72. A gas discharge port 162 in the rear housing 56 communicates through a spring biased check valve with a discharge port 166. The check valve includes a flexible diaphragm 164 biased against the port 162 by a pin 168 and a compression spring 170. The compression spring 170 is backed by a plug 172 threaded into a bore 174 provided in the rear housing.

Remote Switchover Valve

Figure 13:
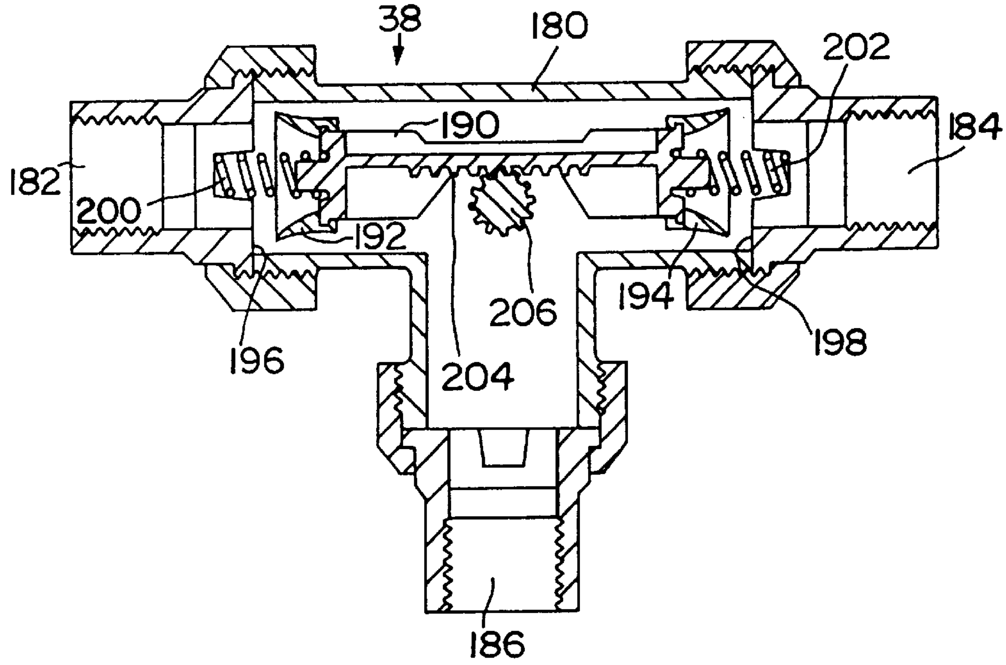
FIG. 13 is an enlarged cross section view of a remote switchover valve included in the gas supply system shown in FIG. 1.
Figure 14:
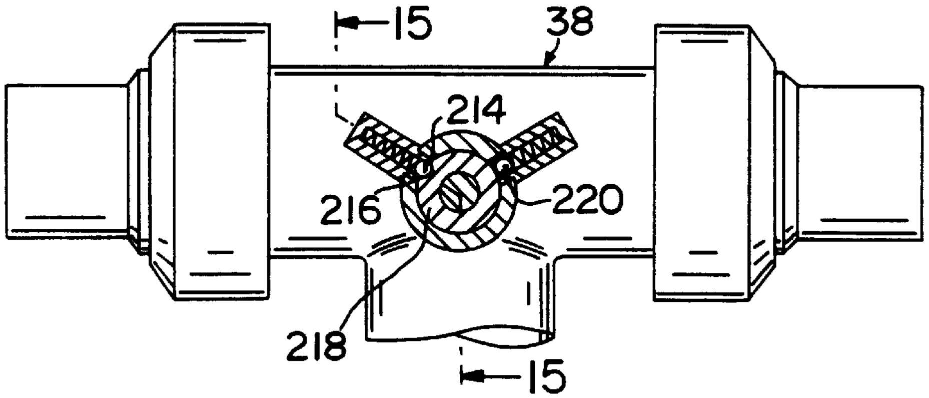
FIG. 14 is a side view of the remote switchover device shown in FIG. 13.
Figure 15:
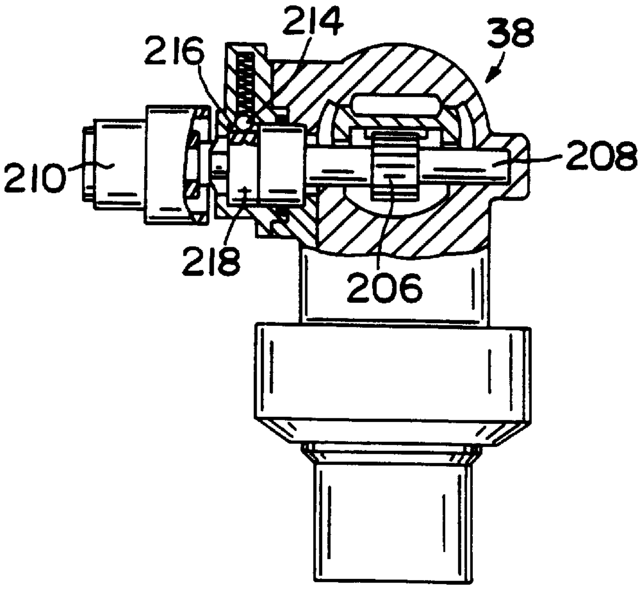
FIG. 15 is a cross section taken along line 15—15 in FIG. 14.

The remote switchover valve 38 is illustrated in greater detail in FIGS. 13–15 and includes a T-shaped valve body 180 including a pair of inlets 182 and 184 connected to the tubing 30 extending from the banks of chlorine tanks and an outlet port 186 connected by tubing 32 to the rotameter 34 and injector 18. The remote switchover device 38 includes a reciprocally movable elongated valve member 190 having opposite ends, the opposite ends of the elongated valve member supporting resilient valve cups 192 and 194. The elongated valve member is movable from the intermediate position shown in FIG. 13 to a position wherein the resilient valve cup 192 at one end of the elongated member 190 is engageable with a seat surface 196 to selectively prevent gas flow through the inlet 182. The elongated valve member 190 is also movable from the intermediate position to the right as shown in FIG. 13 to a position wherein the resilient valve cup 194 sealingly engages a second seat surface 198 to selectively prevent gas flow through the inlet 184.

A pair of compression springs 200 and 202 are provided for biasing the elongated valve member 190 toward the centered or intermediate position shown in FIG. 13.

A detent device is also provided for releasably restraining the elongated valve member 190 in a selected position where the valve member 192 seats against the seat 196 or alternatively for releasably restraining the elongated valve member 190 in a second position wherein the valve member 194 seats against the opposite seat 198 at the opposite end of the valve. the detent device includes a rack 204 formed integrally with the central portion of the elongated valve member 190 and a pinion 206 engaging the rack 204. The pinion 206 is mounted on the end of a manually rotatable shaft 208 (FIG. 15), and a control knob 210 is mounted on the opposite end of the rotatable shaft 208. The control knob 210 can be manually rotated between a first position wherein the elongated valve member 190 is moved to a position where the cup valve 192 engages the valve seat 196. In that position (FIG. 14) a spring biased detent ball 214 engages a notch 216 provided in a collar 218 mounted on the shaft 208. The detent ball 214 releasably holds the elongated valve member 190 in that position. The manual control knob 210 can be rotated in the opposite direction wherein a second spring biased detent ball 220 will engage the notch 216 in the collar 218 to hold the elongated valve member 190 in a position wherein the cup valve 194 engages the other valve seat 198.

In operation of the remote switchover device, the control knob 210 can be rotated to a position wherein the detent ball 214 will hold the elongated valve member 190 in a position wherein one of the cup valves engages a valve seat to block the flow of gas through that inlet 182. The elongated valve member is held in that position by the force of the detent 214 and by the pressure of gas at inlet 184 from the other bank of cylinders. When the gas pressure at inlet 184 from the other bank of cylinders falls below a predetermined level, gas pressure from the alternate bank of cylinders and the force of the return spring 200 will overcome the force of the detent ball 214 and the elongated valve member 190 will be shifted by the compression springs 200 and 202 to a central position. In this position chlorine gas can then be drawn from the second bank of cylinders while the first bank of cylinders is also connected to the vacuum tubing and the injector 18.

Figure 12:
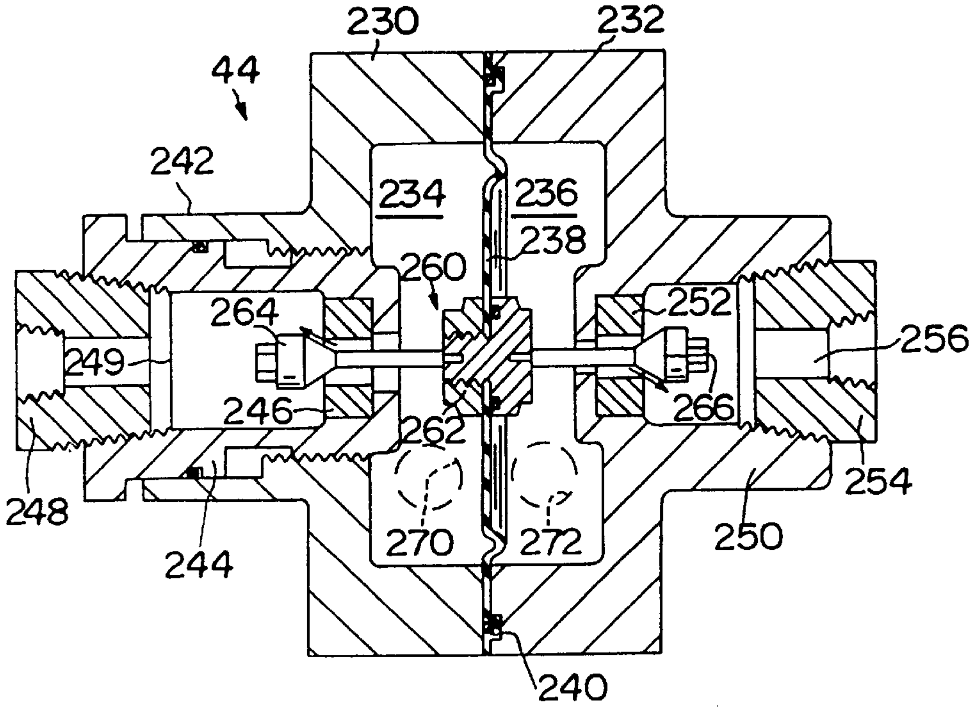
FIG. 12 is an enlarged cross section view of an even drawdown valve included in the gas supply system shown in FIG. 1.

FIG. 12 illustrates in greater detail the even drawdown device 44 which includes a pair of housing portions 230 and 232 defining chambers 234 and 236 separated by a diaphragm 238. The periphery of the diaphragm 238 is clamped between the halves 230 and 232 of the housing and an O-ring 240 provides a fluid tight seal. The left housing portion 230 shown in FIG. 12 includes a boss or sleeve 242 threadably housing a valve seat holder 244. A Teflon valve seat 246 is housed in the valve seat holder 244 and a reducing bushing 248 provides for connection of the tubing 16 with bore 249. The right housing portion 232 includes a boss or sleeve 250 housing a valve seat 252, and a reducing bushing 254 is provided for connecting the other tubing 16 to the inlet bore 256.

The even drawdown device 44 further includes a valve spool 260 having a diaphragm hub 262 clampingly engaging the central portion of the diaphragm 238 such that the valve spool 260 is movable with the diaphragm. One end of the valve spool 260 includes a valve body 264 selectively engageable with the valve seat 246 and the opposite end of the valve spool 260 includes a second valve body 266 engageable with the second valve seat 252. The second valve seat 252 includes a plurality of small orifices 268 between the valve body 266 and the valve seat 252 to permit controlled gas flow past the valve seat 252 when the valve member 266 engages the valve seat 252. The left and right housing portions 230 and 232 are provided with discharge ports 270 and 272, respectively which communicate with the tube 30 providing flow of gas to the rotameter and the injector 18.

In operation of the even drawdown device, vacuum in the tube 30 communicating with rotameter 34 applies a vacuum in the chambers 234 and 236 on both sides of the diaphragm 238, causing gas to be drawn initially through the orifices 268 around the valve body 266. The pressure differential caused by gas flow into the right chamber 236 as seen in FIG. 12 will create a pressure on the diaphragm 238 causing movement of the valve body 264 away from the valve seat 246 to cause flow of gas into the chamber 234 and until the gas pressure in the chambers on 234 and 236 opposite sides of the diaphragm 238 is equal. The gas flow from the tubes 16 communicating with the two gas cylinders 12 will thus be equalized to provide for uniform and even flow from those cylinders 12 to the injector 18.

What is claimed is:

1. A gas feed system for controlling the supply of gas through a conduit to a gas feed device, the gas feed device producing a vacuum in the conduit, the gas feed system comprising:

at least a pair of banks of gas containers, each of the pair of banks of gas containers including at least a first gas container and a second gas container, a first vacuum regulator connected to the first gas container and a second vacuum regulator connected to the second gas container of each bank of gas containers, means connected to the first vacuum regulator and to the second vacuum regulator for providing for even simultaneous discharge of gas from the first gas container and the second gas container, and a remote switchover device for first connecting a selected one of the banks of cylinders to the gas feed device and for then connecting both banks of gas cylinders to the gas feed device when the amount of gas in the selected one of the banks of cylinders falls below a selected amount.

2. A gas feed system as set forth in claim 1 wherein the switchover device includes a valve body, the valve body having a first inlet port connected to the one of the gas containers, and a second inlet port connected to the other of the gas containers, a first shiftable valve member for selectively controlling flow of gas through the first inlet port, and a second shiftable valve member for selectively controlling flow of gas through the second inlet port, the second shiftable valve member being connected to the first shiftable valve member for movement therewith.

3. A gas feed system for supplying a controlled amount of gas as set forth in claim 1 wherein the switchover device includes a valve body having a first inlet port connected to one of the containers, a second inlet port connected to the other of the containers, and a shiftable valve spool including a first valve member for selectively controlling flow of gas through the first inlet port and a second valve member for selectively controlling flow of gas through the second inlet port, the shiftable valve spool being movable between a first position wherein the first valve member provides for flow of gas through the inlet port to the gas discharge outlet and the second valve member closes the second inlet port and a second position wherein the first valve member provides for flow of gas through the first inlet port to the gas discharge outlet and the second valve member provides for flow of gas through the second inlet port to the gas discharge outlet.

4. A gas feed system as set forth in claim 3 and further including detent means for releasably holding the shiftable valve spool in the first position until the gas pressure at the first inlet falls below a selected gas pressure.

5. A gas feed system for supplying a controlled amount of gas from a gas supply including a first bank of gas containers and a second bank of gas containers, the gas feed system comprising:

a switchover device connected to the first bank of containers and the second bank of containers, the switchover device including a gas discharge outlet and means for selectively supplying gas from one of the banks of gas containers through the gas discharge outlet during initial operation of the gas feed system and preventing discharge of gas through the gas discharge outlet from the other of the gas containers during initial operation of the gas feed system and then connecting the other of the banks of gas containers to the gas discharge outlet when the amount of gas in the first bank of gas containers decreases below a selected level and maintaining the first bank of gas containers in communication with the gas discharge outlet when the second bank of gas containers supplies gas to the gas discharge outlet.

6. A gas feed system as set forth in claim 5 wherein said first bank of gas containers further includes means for providing for simultaneous and equal flow of gas from the gas containers in said first bank of gas containers.

7. A gas feed system as set forth in claim 5 and further including a gas feed regulator for controlling the supply of gas from the first gas container to the switchover device, the gas feed regulator comprising a regulator body including a chamber communicating with the switchover device, a valve for controlling the flow of gas from the gas container into the chamber, the valve including a valve seat and a valve member movable with respect to the valve seat, a shiftable body in said chamber and movable in response to vacuum pressure in the chamber, and a pin supported by the movable body, the pin being engagable with the valve member for causing movement of the valve member, the pin being shiftable with respect to the shiftable body between a first position wherein the pin will engage the valve member and cause movement of the valve member in response to movement of the shiftable body, and a second position wherein the pin is spaced from the valve member.

8. A chlorine gas supply system for supplying chlorine gas to a gas injector, the chlorine gas supply system comprising:

a first source of chlorine gas, a second source of chlorine gas, and a remote switchover device connected to the gas injector and to the first source of chlorine gas and to the second source of chlorine gas for controlling the supply of chlorine gas to the injector, the remote switchover device supplying chlorine gas from the first source of chlorine gas to the injector during initial operation of the chlorine gas supply system and for supplying chlorine gas from the second source of chlorine gas and the first source of chlorine gas once the gas pressure in the first source of chlorine gas falls below a selected level.

9. A chlorine gas supply system as set forth in claim 8 wherein the switchover device includes a valve body having a first inlet communicating with the first source of chlorine gas, a second inlet communicating with the second source of chlorine gas, and an outlet communicating with the injector for supplying gas to the injector, and a shiftable valve member shiftable between a first position wherein the valve member prevents gas flow from the second inlet to the outlet and a second position wherein the valve member provides for gas flow from the first inlet and the second inlet to the outlet.

10. A chlorine gas supply system as set forth in claim 8 wherein a conduit connects a gas injector to the switchover device and wherein the gas injector includes means for generating vacuum in the conduit.

11. A chlorine gas supply system as set forth in claim 9 wherein the shiftable valve member is movable to a third position wherein the valve member prevents gas flow from the first inlet to the outlet.

12. A chlorine gas supply system as set forth in claim 11 wherein the switchover device includes means for selectively holding the shiftable valve member in the first position until the vacuum that the outlet exceeds a selected vacuum.

13. A gas feed regulator for controlling the supply of gas from a gas container through a conduit, the gas feed regulator, comprising:

a regulator body including a chamber communicating with the conduit;

a valve for controlling the flow of gas from the gas container into the chamber, the valve including:

a valve seat and a valve member movable with respect to the valve seat;

a shiftable body in said chamber and movable in response to vacuum pressure in the chamber;

an engaging member supported by the movable body, the engaging member engageable with the valve member for causing movement of the valve member, away from the valve seat and the engaging member being shiftable with respect to the shiftable body between a first position wherein the engaging member will engage the valve member and cause movement of the valve member in response to movement of the shiftable body and a second position wherein the engaging member is spaced from the valve member; and a control knob supported by the regulator body for movement from a "standby" position to an "on" position and to an "empty" position.

14. The gas feed regulator of claim 13, wherein the control knob is connected to the shiftable body such that the control knob is moved to the "on" position when vacuum in the chamber causes the engaging member to engage the valve member.

15. The gas feed regulator of claim 14, wherein the control knob is moved from the "on" position to the "empty" position when the vacuum in the chamber exceeds a selected vacuum.

16. The gas feed regulator of claim 15, wherein the control knob is rotatable from the "empty" position to an "off" position, and wherein the control knob is operably connected to the engaging member to cause the engaging member to move to a position where it will not engage the valve member when the control knob is moved from the "empty" position to the "off" position.

17. A gas feed regulator for controlling the supply of gas from a container through a conduit, the gas feed regulator comprising:

a regulator body including a chamber communicating with the conduit;

a shiftable body in said chamber and movable in response to vacuum pressure in the chamber; and an engaging member moveable with the shiftable body, a valve for controlling the flow of gas from the gas container into the chamber, the valve including a first valve seat and a first valve member engageable with the first valve seat, and second valve seat and a second valve member engageable with the second valve seat, the second valve member being positionable to be engaged by the engaging member when the shiftable body is moved toward the valve, and the second valve member being movable away from the second valve seat when the second valve member is engaged by the engaging member;

wherein the first valve member is resiliently connected to the second valve member such that the first valve member is biased away from the first valve seat when the second valve member is moved away from the second valve seat.

18. The gas feed regulator of claim 17, further including a diaphragm having a periphery supported by the regulator body and a central portion connected to the shiftable body for causing movement of the shiftable body.

19. A gas feed system for supplying a controlled amount of gas from a gas supply including at least two gas containers, the gas feed system comprising:

a switch-over device connected to one of the gas containers and connected to the other of the gas containers, the switch-over device including a gas discharge outlet and selectively supplying gas from the one of the gas containers through the gas discharge outlet during initial operation of the gas feed system and preventing discharge of gas through the gas discharge outlet from the other of the gas containers during initial operation and then connecting the other of the gas containers to the gas discharge outlet when the amount of gas in the first gas container falls below a selected amount and maintaining one of the gas containers in communication with the gas discharge outlet when the other of the gas containers supplies gas to the gas discharge outlet, wherein the switch-over device includes a valve body, the valve body having a first inlet port connected to the one of the gas containers, and a second inlet port connected to the other of the gas containers, a first shiftable valve member for selectively controlling flow of gas through the first inlet port, and a second shiftable valve member for selectively controlling flow of gas through the second inlet port, the second shiftable valve member being connected to the first shiftable valve member for movement therewith.

20. A gas feed system for supplying a controlled amount of gas from a gas supply including at least two gas containers, the gas feed system comprising:

a switch-over device connected to one of the gas containers and connected to the other of the gas containers, the switch-over device including a gas discharge outlet and selectively supplying gas from the one of the gas containers through the gas discharge outlet during initial operation of the gas feed system and preventing discharge of gas through the gas discharge outlet from the other of the gas containers during initial operation and then connecting the other of the gas containers to the gas discharge outlet when the amount of gas in the first gas container falls below a selected amount and maintaining one of the gas containers in communication with the gas discharge outlet when the other of the gas containers supplies gas to the gas discharge outlet, wherein the switch-over device includes a valve body having a first inlet port connected to one of the containers, a second inlet port connected to the other of the containers, and a shiftable valve spool including a first valve member for selectively controlling flow of gas through the first inlet port and a second valve member for selectively controlling flow of gas through the second inlet port, the shiftable valve spool being movable between a first position wherein the first valve member provides for flow of gas through the first inlet port to the gas discharge outlet and the second valve member closes the second inlet port and a second position wherein the first valve member provides for flow of gas through the first inlet port to the gas discharge outlet and the second valve member provides for flow of gas through the second inlet port to the gas discharge outlet, the switch-over device further including detent means for releasably holding the shiftable valve spool in the first position until the gas pressure at the first inlet falls below a selected gas pressure.

* * * * *